United States Patent
Yang et al.

(10) Patent No.: US 8,679,440 B2
(45) Date of Patent: Mar. 25, 2014

(54) METHOD FOR PREPARING NITRIDE NANOMATERIALS

(75) Inventors: Chia-Min Yang, Hsinchu (TW); Bo-Kai Chen, Hsinchu (TW); Chia-Hua Ho, Hsinchu (TW)

(73) Assignee: National Tsing Hua University, Hsinchu (TW)

(*) Notice: Subject to any disclaimer, the term of this patent is extended or adjusted under 35 U.S.C. 154(b) by 225 days.

(21) Appl. No.: 13/111,369

(22) Filed: May 19, 2011

(65) Prior Publication Data
US 2012/0244062 A1    Sep. 27, 2012

(30) Foreign Application Priority Data
Mar. 23, 2011  (TW) .............................. 100109892 A

(51) Int. Cl.
*C01B 21/06*     (2006.01)
*C01B 21/20*     (2006.01)
*C01B 21/072*    (2006.01)

(52) U.S. Cl.
USPC ........... 423/409; 423/385; 423/412; 427/377; 977/777

(58) Field of Classification Search
None
See application file for complete search history.

(56) References Cited

U.S. PATENT DOCUMENTS

| | | | |
|---|---|---|---|
| 6,645,444 B2 * | 11/2003 | Goldstein | 423/1 |
| 7,981,327 B2 * | 7/2011 | Sakaguchi et al. | 252/518.1 |
| 2006/0254461 A1 * | 11/2006 | Hong et al. | 106/287.19 |
| 2012/0214292 A1 * | 8/2012 | Mosley et al. | 438/478 |

* cited by examiner

*Primary Examiner* — Guinever Gregorio
(74) *Attorney, Agent, or Firm* — Muncy, Geissler, Olds & Lowe, P.C.

(57) ABSTRACT

The present invention relates to a method for preparing nitride nanomaterials, including: providing a first precursor and a second precursor, in which the first precursor is a transition metal precursor, a group IIIA precursor, a group IVA precursor or a mixture thereof, and a second precursor is a nitrogen-containing aromatic compound; and heating the first precursor with the second precursor to form a nitride nanomaterial. Accordingly, the present invention provides a simpler, non-toxic, more widely applied and low-cost method for preparing nitride nanomaterials.

10 Claims, 4 Drawing Sheets

METHOD FOR PREPARING NITRIDE NANOMATERIALS

CROSS REFERENCE TO RELATED APPLICATION

This application claims the benefits of the Taiwan Patent Application Serial Number 100109892, filed on Mar. 23, 2011, the subject matter of which is incorporated herein by reference.

BACKGROUND OF THE INVENTION

1. Field of the Invention

The present invention relates to a method for preparing nitride nanomaterials, more particularly, to a simpler, safer, nontoxic, more widely applied and low-cost method for preparing nitride nanomaterials.

2. Description of Related Art

Nitride materials are one of important artificial synthetic materials and have been rapidly developed in recent years. In particular, numerous kinds of nitride materials have been widely applied, for example, including: (1) transition metal nitrides (e.g. VN, CrN, $W_2N$, $Mo_2N$), which have many excellent properties, such as high hardness, high melting point, high wear resistance, high corrosion resistance, high spread resistance and good thermal and chemical stability, and thus can be applied in high temperature structural ceramics, hard steels, tool coatings, diffusion barriers in electric components, and even catalysis due to their electronic structure similar to that of precious metals; (2) group IIIA nitrides, which have direct bandgap, strong chemical bond and good thermal conductivity and are used as important photoelectric semiconductor materials, such as, GaN which is the most potential material for white light LEDs, AlN used as an important electronic material, InN applicable to chemical and biosensors, and BN having application potential as, for example, a heat dispersing material, a cutting material and a lubricant owing to its high insulating property, high thermal conductivity, high lubricity, high temperature resistance and anti-sticking property; and (3) group IVA nitrides, having excellent properties of high heat resistance, high corrosion resistance, high wear resistance, high toughness and thus being potential in the application of the machinery and electronic fields, particularly silicon nitride, silicon carbide and other ceramic materials having high strength at high temperature in addition to the above-mentioned properties and thus being important structural ceramic materials.

Based on the above-mentioned excellent properties of nitrides and the rapid development of nanotechnology advantageous to the extension of nitride application range, there is an increasing interest in the manufacturing method and properties of nitride nanomaterials. The known methods for manufacturing nitrides include: sintering metal precursors under ammonia gas to prepare nanocrystalline nitrides; or reacting molecular precursors that contain nitrogen and metal into nanocrystalline nitrides.

However, the conventional sintering method under ammonia gas is dangerous and toxic, while the other conventional method for converting precursors into nitrides cannot be applied to all metals and has to be performed in the oxygen- and moisture-free condition, resulting in process complexity and high manufacturing cost.

SUMMARY OF THE INVENTION

The object of the present invention is to provide a simpler, safer, nontoxic, more widely applied and low-cost method for preparing nitride nanomaterials.

To achieve the object, the present invention provides a method for preparing a nitride nanomaterial, including: (A) providing a first precursor and a second precursor, in which the first precursor is a transition metal precursor, a group IIIA precursor, a group IVA precursor or a mixture thereof, and a second precursor is a nitrogen-containing aromatic compound; and (B) heating the first precursor with the second precursor to form a nanocrystalline nitride material.

Accordingly, the present invention uses a nitrogen-containing aromatic compound as a nitrogen source, and thereby the method provided by the present invention is safer, nontoxic and environmentally friendly compared to the conventional method that uses ammonia gas as the nitrogen source. Besides, in comparison with another conventional method which uses molecular precursors containing nitrogen and metal to prepare nitrides, the method provided by the present invention is low cost and can be widely and simply applied.

In the present invention, the first precursor and the second precursor can be directly mixed to perform a reaction by heating so as to form a nitride nanomaterial. Accordingly, the step (A) may include: (a1) providing a precursor mixture solution including a fist precursor, a second precursor and a solvent; and (a2) removing the solvent. Herein, the solvent may be water, an alcohol solvent (such as methanol, ethanol, n-propanol, isopropanol), a ketone solvent (such as acetone) or a mixture thereof.

In the present invention, the first precursor and the second precursor may be loaded to a support to perform a reaction by heating so as to form a nitride nanomaterial. For example, the precursor mixture solution may be provided to a support, and thereby the step (A) may include: (a1) providing a precursor mixture solution including a fist precursor, a second precursor and a solvent to a support; and (a2) removing the solvent. Herein, the solvent may be water, an alcohol solvent (such as methanol, ethanol, n-propanol, isopropanol), a ketone solvent (such as acetone) or a mixture thereof. Alternatively, one precursor may be first provided to a support, followed by removing the solvent, and then the other precursor is further provided to the support. Accordingly, the step (A) may include: (a1) provided a first precursor solution including a first precursor and a first solvent to a support; (a2) removing the first solvent; (a3) providing a second precursor solution including a second precursor and a second solvent to the support; and (a4) removing the second solvent. Alternatively, the step (A) may include: (a1) provided a second precursor solution including a second precursor and a second solvent to a support; (a2) removing the second solvent; (a3) providing a first precursor solution including a first precursor and a first solvent to the support; and (a4) removing the first solvent. Herein, the first solvent and the second solvent may independently be water, an alcohol solvent (such as methanol, ethanol, n-propanol, isopropanol), a ketone solvent (such as acetone) or a mixture thereof. If precipitation would occur in the precursor mixture solution, the preferred process is to provide one precursor solution to a support, followed by removing solvent, and then to provide the other precursor solution.

In the present invention, the transition metal precursor is not particularly limited, and may be any transition metal precursor capable of reacting with the nitrogen-containing aromatic compound to form a nitride. Preferably, the transition metal precursor is a Ti-containing precursor, a Zr-containing precursor, a Hf-containing precursor, a V-containing precursor, a Ta-containing precursor, a Nb-containing precursor, a Cr-containing precursor, a Mo-containing precursor, a W-containing precursor, a Mn-containing precursor, a Re-containing precursor, a Fe-containing precursor, a Co-containing precursor, a Ni-containing precursor, a Cu-containing precursor, a Zn-containing precursor or a mixture thereof. The specific examples of the transition metal precursor include, but are not limited to, $(CH_3CH(O-)CO_2NH_4)_2Ti(OH)_2$, titanium oxysulfate, titanium(IV) bromide, titanium (IV) chloride, titanium(IV) fluoride, titanium(IV) ethoxide, titanium(IV) i-propoxide, titanium(IV) n-butoxide, zirconium(IV) dichloride oxide, zirconium(IV) dinitrate oxide, zirconium(IV) ethoxide, zirconium(IV) fluoride, zirconium(IV) chloride, zirconium(IV) n-butoxide, hafnium(IV) chloride, hafnium(IV) dichloride oxide, hafnium(IV) ethoxide, vanadium(IV) sulfate oxide, vanadium(III) acetylacetonate, vanadium(III) bromide, vanadium(III) chloride, vanadium(V) trichloride oxide, niobium(V) chloride, niobium(V) fluoride, niobium(V) ethoxide, tantalum(V) fluoride, tantalum(V) chloride, tantalum(V) bromide, tantalum(V) ethoxide, tantalum(V) methoxide, chromium(III) nitrate, chromium(III) acetate, chromium(III) acetylacetonate, chromium(III) fluoride, chromium(III) bromide, chromium(III) sulfate, ammonium molybdate, molybdenum(III) chloride, tungstophosphoric acid ($H_3PW_{12}O_{40}$), ammonium tungstate, tungsten(VI) chloride, tungstic acid, manganese(II) nitrate, manganese(II) chloride, manganese(II) bromide, manganese(II) fluoride, manganese(III) acetate, manganese(III) acetylacetonate, rhenium(V) chloride, iron(III) nitrate iron(II) acetate, iron(III) acetylacetonate, iron(II) bromide, iron(II) chloride, iron(II) fluoride, cobalt(II) nitrate, cobalt(II) acetate, cobalt(II) acetylacetonate, cobalt(II) bromide, cobalt(II) chloride, cobalt(II) fluoride, nickel(II) nitrate, nickel(II) acetate, nickel(II) bromide, nickel(II) chloride, nickel(II) fluoride, nickel(II) carbonate, copper(II) nitrate, copper(II) acetate, copper(II) acetylacetonate, copper(II) bromide, copper(H) chloride, copper(II) fluoride, copper(II) carbonate, copper(II) methoxide, zinc nitrate, zinc bromide, zinc chloride, zinc fluoride, zinc acetate, zinc carbonate or a mixture thereof. Herein, the above-mentioned compounds also may exist in hydrate or solvate forms, and thereby hydrates or solvates of the above-mentioned compounds also are included in the scope of the present invention.

In the present invention, the group IIIA precursor is not particularly limited, and may be any group IIIA precursor capable of reacting with the nitrogen-containing aromatic compound to form a nitride. Preferably, the group IIIA precursor is a B-containing precursor, a Al-containing precursor, a Ga-containing precursor, a In-containing precursor or a mixture thereof. The specific examples of the group IIIA precursor include, but are not limited to, boronic acid, boron bromide, aluminum nitrate, aluminum acetate, aluminum bromide, aluminum chloride, aluminum fluoride, aluminum ethoxide, aluminum i-propoxide, gallium(III) nitrate, gallium (III) acetylacetonate, gallium(III) bromide, gallium(III) chloride, gallium(III) fluoride, indium(III) nitrate, indium(III) acetate, indium(III) acetylacetonate, indium(III) bromide, indium(III) chloride, indium(III) fluoride or a mixture thereof. Herein, the above-mentioned compounds also may exist in hydrate or solvate forms, and thereby hydrates or solvates of the above-mentioned compounds also are included in the scope of the present invention.

In the present invention, the group IVA precursor is not particularly limited, and may be any group WA precursor capable of reacting with the nitrogen-containing aromatic compound to form a nitride. Preferably, the group WA precursor is a C-containing precursor, a Ge-containing precursor, a Sn-containing precursor or a mixture thereof. The specific examples of the group IVA precursor include, but are not limited to, furfuryl alcohol, germanium(IV) ethoxide, germanium(IV) bromide, germanium(IV) chloride, germanium (IV) iodide, tin(IV) chloride, tin(II) acetate, tin(II) acetylacetonate, tin(II) bromide, tin(IV) t-butoxide, tin(II) chloride, tin(II) fluoride, tin(II) ethoxide or a mixture thereof. Herein, the above-mentioned compounds also may exist in hydrate or solvate forms, and thereby hydrates or solvates of the above-mentioned compounds also are included in the scope of the present invention.

In the present invention, the nitrogen-containing aromatic compound is not particularly limited, and may be any aromatic compound containing at least one nitrogen atom. Preferably, the nitrogen-containing aromatic compound is triazole, tetrazole or a mixture thereof.

In the present invention, the support is not particularly limited, and may be any suitable porous support. The examples of the support include porous silica, porous metal oxides or porous carbon.

In the present invention, the heating temperature in the step (B) preferably ranges from about 400° C. to 1500° C., such that the first precursor and the second precursor can be reacted into a nitride nanomaterial.

In the present invention, the step (B) preferably is performed under an oxygen-free atmosphere. For example, the step (B) may be performed under vacuum or an atmosphere containing inert gas (such as $N_2$, He, Ne, Ar).

Accordingly, compared to the above-mentioned conventional methods, the method provided by the present invention is simpler, safer, nontoxic, environmentally friendly, more widely applied and low cost. In particular, the method provided by the present invention can prepare nitride nanomaterials of smaller diameter (about 2 nm to 50 nm) and high dispersion.

DETAILED DESCRIPTION OF THE PREFERRED EMBODIMENT

Hereafter, examples will be provided to illustrate the embodiments of the present invention. Other advantages and effects of the invention will become more apparent from the disclosure of the present invention. Other various aspects also may be practiced or applied in the invention, and various modifications and variations can be made without departing from the spirit of the invention based on various concepts and applications.

EXAMPLE 1

A support was impregnated with a first precursor solution including chromium precursor, and then the first precursor impregnated support was dried to remove the solvent contained in the first precursor solution. Subsequently, the support was further impregnated with a second precursor solution including a nitrogen-containing aromatic compound and then dried to remove the solvent in the second precursor solution. Finally, the impregnated support was heated to about 700° C. under vacuum to react the chromium precursor with the nitrogen-containing aromatic compound for about 2 hours and thus to form chromium nitride nanomaterial.

Figure 1:
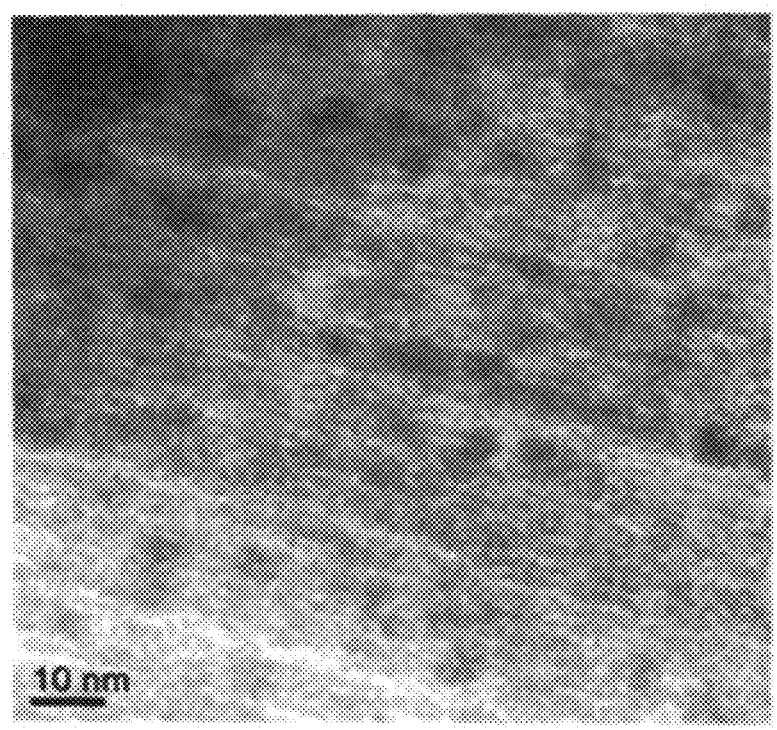
FIG. 1 shows a transmission electron microscopy (TEM) image of CrN nanomaterial in the mesoporous silica SBA-15 according to one preferred example of the present invention.
Figure 2:
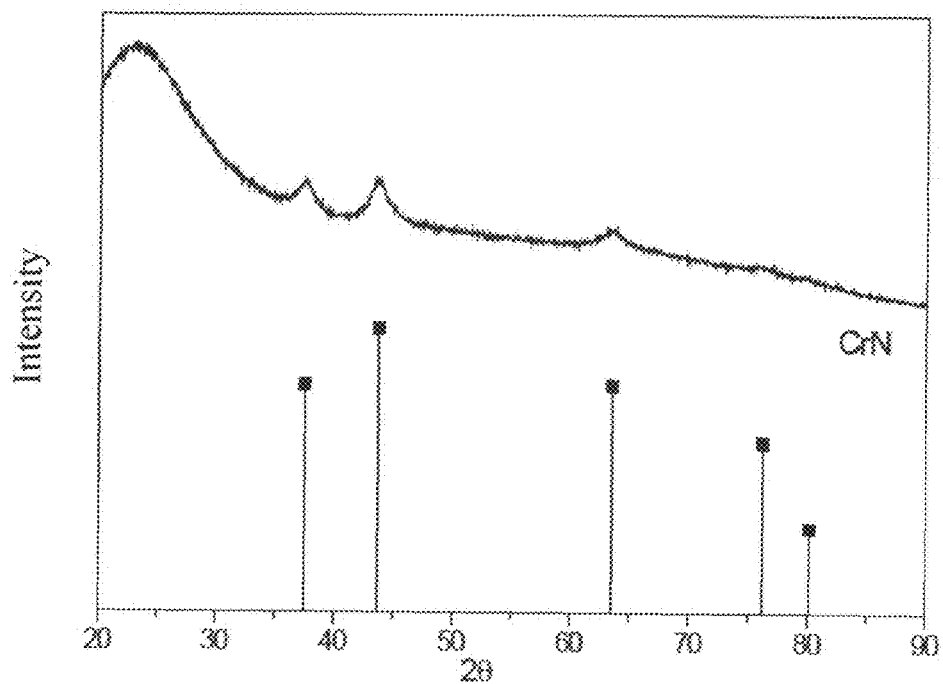
FIG. 2 shows an X-ray diffraction diagram of CrN nanomaterial in the mesoporous silica SBA-15 according to one preferred example of the present invention.

Herein, the present example used $Cr(NO_3)_3 \cdot 9H_2O$ and triazole as the chromium precursor and the nitrogen-containing aromatic compound, respectively. In addition, ethanol was used as the solvent to dissolve $Cr(NO_3)_3 \cdot 9H_2O$ and triazole, and removed by a drying process at 60° C. for 4 hours. Meanwhile, the present example utilized mesoporous silica SBA-15 as the support, therewith the molar ratio of mesoporous silica SBA-15:$Cr(NO_3)_3 \cdot 9H_2O$:triazole being 1:0.1:0.21, so as to fabricate CrN nanomaterial of about 5 nm in diameter in the pores of the support. Its transmission electron microscopy (TEM) image and X-ray diffraction diagram are shown in FIGS. 1 and 2, respectively.

EXAMPLE 2

A support was impregnated with a first precursor solution including molybdenum precursor, and then the first precursor impregnated support was dried to remove the solvent contained in the first precursor solution. Subsequently, the support was further impregnated with a second precursor solution including a nitrogen-containing aromatic compound and then dried to remove the solvent in the second precursor solution. Finally, the impregnated support was heated to about 700° C. under vacuum to react the molybdenum precursor with the nitrogen-containing aromatic compound for about 2 hours and thus to form molybdenum nitride nanomaterial.

Figure 3:
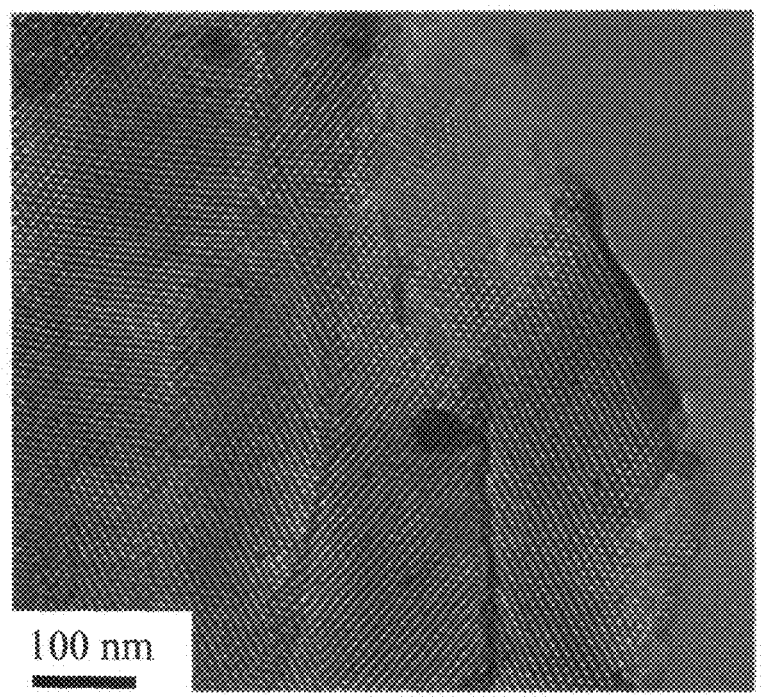
FIG. 3 shows a transmission electron microscopy (TEM) image of $Mo_2N$ nanomaterial in the mesoporous silica SBA-15 according to one preferred example of the present invention.
Figure 4:
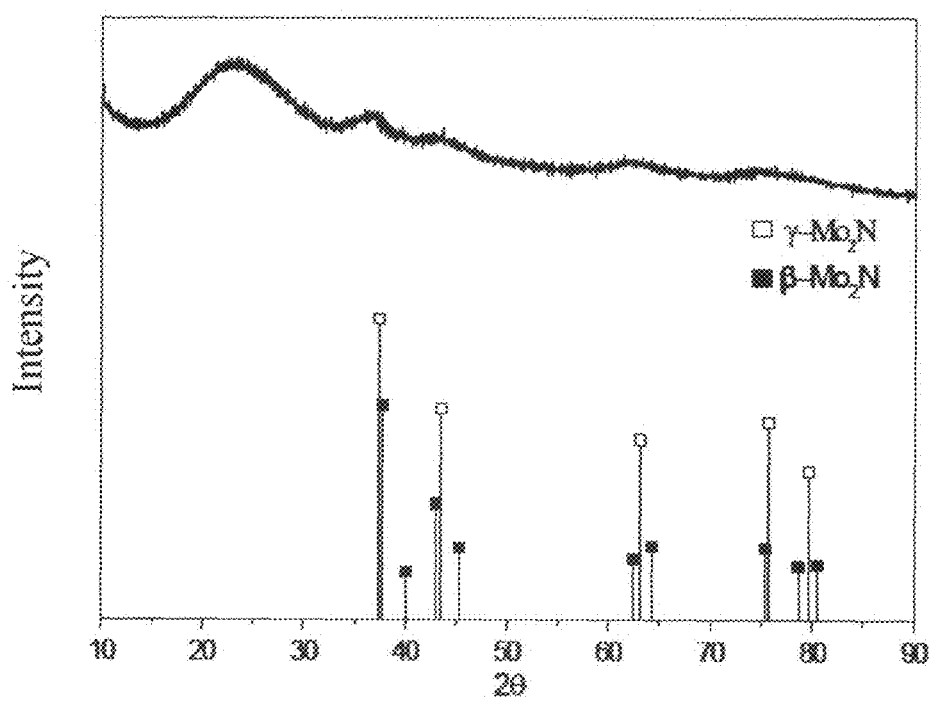
FIG. 4 shows an X-ray diffraction diagram of $Mo_2N$ nanomaterial in the mesoporous silica SBA-15 according to one preferred example of the present invention.

Herein, the present example used $(NH_4)_6Mo_7O_{24} \cdot 4H_2O$ and triazole as the molybdenum precursor and the nitrogen-containing aromatic compound, respectively. In addition, water and ethanol were used as the solvents to respectively dissolve $(NH_4)_6Mo_7O_{24} \cdot 4H_2O$ and triazole. Ethanol can be removed by a drying process at 60° C. for 4 hours, while water can be removed by a drying process at 100° C. for 12 hours. Meanwhile, the present example utilized mesoporous silica SBA-15 as the support, therewith the molar ratio of mesoporous silica SBA-15:$(NH_4)_6Mo_7O_{24} \cdot 4H_2O$:triazole being 1:0.03:0.21, so as to fabricate $Mo_2N$ nanomaterial of about 5 nm in diameter in the pores of the support. Its transmission electron microscopy (TEM) image and X-ray diffraction diagram are shown in FIGS. 3 and 4, respectively.

EXAMPLE 3

A support was impregnated with a first precursor solution including tungsten precursor, and then the first precursor impregnated support was dried to remove the solvent contained in the first precursor solution. Subsequently, the support was further impregnated with a second precursor solution including a nitrogen-containing aromatic compound and then dried to remove the solvent in the second precursor solution. Finally, the impregnated support was heated to about 700° C. under vacuum to react the tungsten precursor with the nitrogen-containing aromatic compound for about 2 hours and thus to form tungsten nitride nanomaterial.

Figure 5:
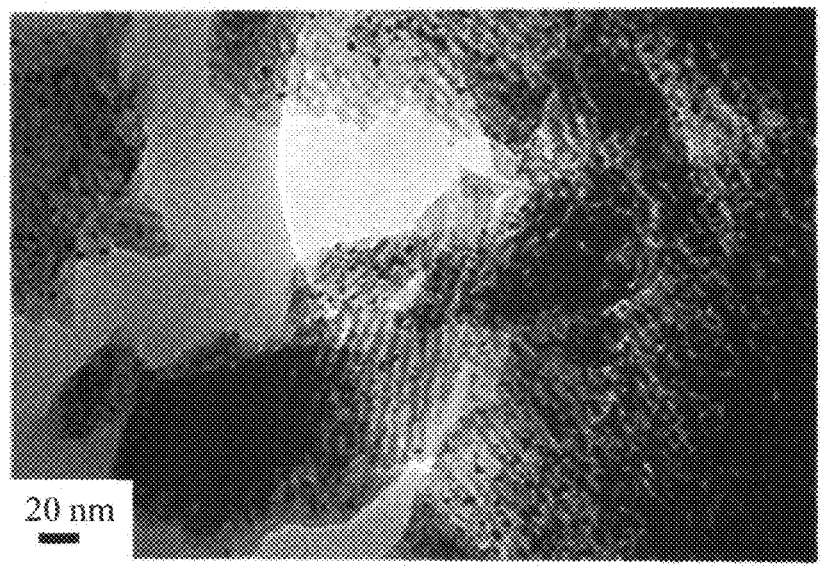
FIG. 5 shows a transmission electron microscopy (TEM) image of $W_2N$ nanomaterial in the mesoporous silica SBA-15 according to one preferred example of the present invention.
Figure 6:
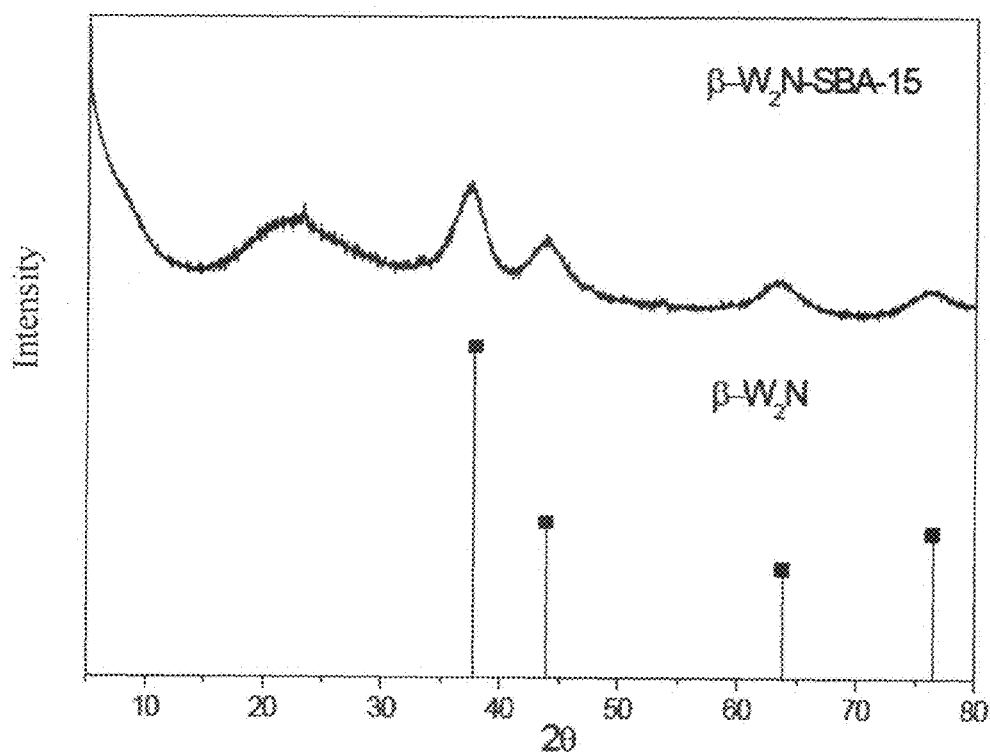
FIG. 6 shows an X-ray diffraction diagram of $W_2N$ nanomaterial in the mesoporous silica SBA-15 according to one preferred example of the present invention.

Herein, the present example used $H_3PW_{12}O_{40} \cdot xH_2O$ and triazole as the tungsten precursor and the nitrogen-containing aromatic compound, respectively. In addition, ethanol was used as the solvent to dissolve $H_3PW_{12}O_{40} \cdot xH_2O$ and triazole, and removed by a drying process at 60° C. for 4 hours. Meanwhile, the present example utilized mesoporous silica SBA-15 as the support, therewith the molar ratio of mesoporous silica SBA-15:$H_3PW_{12}O_{40} \cdot xH_2O$:triazole being 1:0.0075:0.21, so as to fabricate $W_2N$ nanomaterial of about 5 nm in diameter in the pores of the support. Its transmission electron microscopy (TEM) image and X-ray diffraction diagram are shown in FIGS. 5 and 6, respectively.

EXAMPLE 4

A support was impregnated with a first precursor solution including gallium precursor, and then the first precursor impregnated support was dried to remove the solvent contained in the first precursor solution. Subsequently, the support was further impregnated with a second precursor solution including a nitrogen-containing aromatic compound and then dried to remove the solvent in the second precursor solution. Finally, the impregnated support was heated to about 700° C. under vacuum to react the gallium precursor with the nitrogen-containing aromatic compound for about 2 hours and thus to form gallium nitride nanomaterial.

Figure 7:
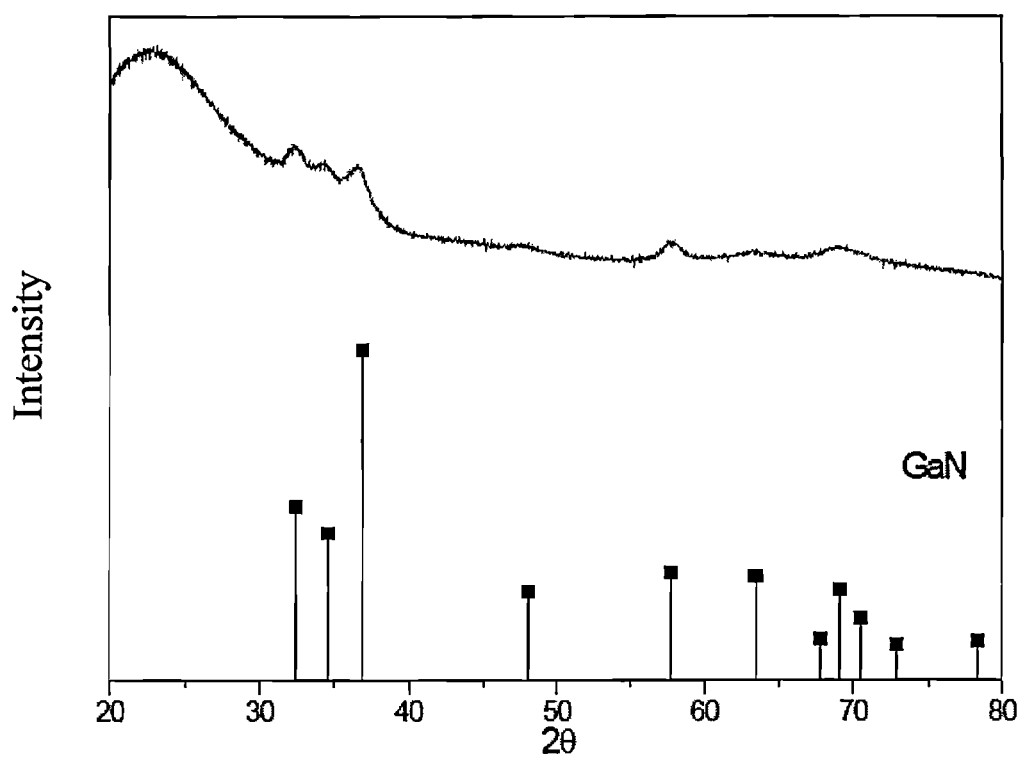
FIG. 7 shows an X-ray diffraction diagram of GaN nanomaterial in the mesoporous silica SBA-15 according to one preferred example of the present invention.

Herein, the present example used $Ga(NO_3)_3 \cdot xH_2O$ and triazole as the gallium precursor and the nitrogen-containing aromatic compound, respectively. In addition, ethanol was used as the solvent to dissolve $Ga(NO_3)_3 \cdot xH_2O$ and triazole, and removed by a drying process at 60° C. for 4 hours. Meanwhile, the present example utilized mesoporous silica SBA-15 as the support, therewith the molar ratio of mesoporous silica SBA-15:$Ga(NO_3)_3 \cdot xH_2O$:triazole being 1:0.2:0.302, so as to fabricate GaN nanomaterial of about 5 nm in diameter in the pores of the support. Its X-ray diffraction diagram are shown in FIG. 7.

The above examples are intended for illustrating the embodiments of the invention, and other various aspects also may be practiced or applied in the invention. For example, one having ordinary skill in the art can alter the sequence of adding the first precursor and the second precursor. That is, the support can be first impregnated with a second precursor solution, followed by removing the solvent in the second precursor solution, and then the support can be further impregnated with a first precursor solution, followed by removing the solvent in the first precursor solution. Alternatively, if no precipitation would occur in the mixture of the first precursor solution and the second precursor solution, the first precursor solution may be mixed with the second precursor solution, and the solvents in these solutions are simultaneously removed. The above examples are not intended for restricting the scope of protection of the subject invention, and the scope of the subject invention is based on the claims as appended.

What is claimed is:
1. A method for preparing a nitride nanomaterial, comprising:
(A) providing a first precursor and a second precursor, wherein the first precursor is a transition metal precursor, a group IIIA precursor, a group IVA precursor or a mixture thereof, and a second precursor is a nitrogen-containing aromatic compound; and
(B) heating the first precursor with the second precursor to form a nanocrystalline nitride material;
wherein the transition metal precursor is $(CH_3CH(O—)CO_2NH_4)_2Ti(OH)_2$, titanium oxysulfate, titanium(IV) bromide, titanium(IV) chloride, titanium(IV) fluoride, titanium(IV) ethoxide, titanium(IV) i-propoxide, titanium(IV) n-butoxide, zirconium(IV) dichloride oxide, zirconium(IV) dinitrate oxide, zirconium(IV) ethoxide, zirconium(IV) fluoride, zirconium(IV) chloride, zirconium(IV) n-butoxide, hafnium(IV) chloride, hafnium(IV) dichloride oxide, hafnium(IV) ethoxide, vanadium (IV) sulfate oxide, vanadium(III) acetylacetonate, vanadium(III) bromide, vanadium(III) chloride, vanadium(V) trichloride oxide, niobium(V) chloride, niobium (V) fluoride, niobium(V) ethoxide, tantalum(V) fluoride, tantalum(V) chloride, tantalum(V) bromide, tantalum(V) ethoxide, tantalum(V) methoxide, chromium(III) nitrate, chromium(III) acetate, chromium(III) acetylacetonate, chromium(III) fluoride, chromium(III) bromide, chromium(III) sulfate, ammonium molybdate, molybdenum(III) chloride, tungstophosphoric acid $(H_3PW_{12}O_{40})$, ammonium tungstate, tungsten(VI) chloride, tungstic acid, manganese(II) nitrate, manganese(II) chloride, manganese(II) bromide, manganese(II) fluoride, manganese(III) acetate, manganese(III) acetylacetonate, rhenium(V) chloride, iron(III) nitrate iron(III) acetate, iron(III) acetylacetonate, iron(II) bromide, iron (II) chloride, iron(II) fluoride, cobalt(II) nitrate, cobalt (II) acetate, cobalt(II) acetylacetonate, cobalt(II) bromide, cobalt(II) chloride, cobalt(II) fluoride, nickel(II) nitrate, nickel(II) acetate, nickel(II) bromide, nickel(II) chloride, nickel(II) fluoride, nickel(II) carbonate, copper(II) nitrate, copper(II) acetate, copper(II) acetylacetonate, copper(II) bromide, copper(II) chloride, copper (II) fluoride, copper(II) carbonate, copper(II) methoxide, zinc nitrate, zinc bromide, zinc chloride, zinc fluoride, zinc acetate, zinc carbonate or a mixture thereof;
wherein the group IIIA precursor is boronic acid, boron bromide, aluminum nitrate, aluminum acetate, aluminum bromide, aluminum chloride, aluminum fluoride, aluminum ethoxide, aluminum i-propoxide, gallium (III) nitrate, gallium(III) acetylacetonate, gallium(III) bromide, gallium(III) chloride, gallium(III) fluoride, indium(III) nitrate, indium(III) acetate, indium(III) acetylacetonate, indium(III) bromide, indium(III) chloride, indium(III) fluoride or a mixture thereof; and
wherein the group IVA precursor is furfuryl alcohol, germanium(IV) ethoxide, germanium(IV) bromide, germanium(IV) chloride, germanium(IV) iodide, tin(IV) chloride, tin(II) acetate, tin(II) acetylacetonate, tin(II) bromide, tin(IV) t-butoxide , tin(II) chloride, tin(II) fluoride, tin(II) ethoxide or a mixture thereof.

2. The method as claimed in claim 1, wherein in the step (A) the first precursor and the second precursor are loaded to a support.

3. The method as claimed in claim 2, wherein the step (A) comprises:
(a1) providing a precursor mixture solution including a fist precursor, a second precursor and a solvent to a support; and
(a2) removing the solvent.

4. The method as claimed in claim 2, wherein the step (A) comprises:
(a1) provided a first precursor solution including a first precursor and a first solvent to a support;
(a2) removing the first solvent;
(a3) providing a second precursor solution including a second precursor and a second solvent to the support; and
(a4) removing the second solvent.

5. The method as claimed in claim 2, wherein the step (A) comprises:
(a1) provided a second precursor solution including a second precursor and a second solvent to a support;
(a2) removing the second solvent;
(a3) providing a first precursor solution including a first precursor and a first solvent to the support; and
(a4) removing the first solvent.

6. The method as claimed in claim 2, wherein the support is porous silica, porous metal oxides or porous carbon.

7. The method as claimed in claim 1, wherein the nitrogen-containing aromatic compound is triazole, tetrazole or a mixture thereof.

8. The method as claimed in claim 1, wherein the step (B) is performed by heating to a temperature that ranges from 400° C. to 1500° C.

9. The method as claimed in claim 1, wherein the step (B) is performed under an oxygen-free atmosphere.

10. The method as claimed in claim 1, wherein the nitride nanomaterial ranges from 2 nm to 50 nm in diameter.

* * * * *